Figure 1:
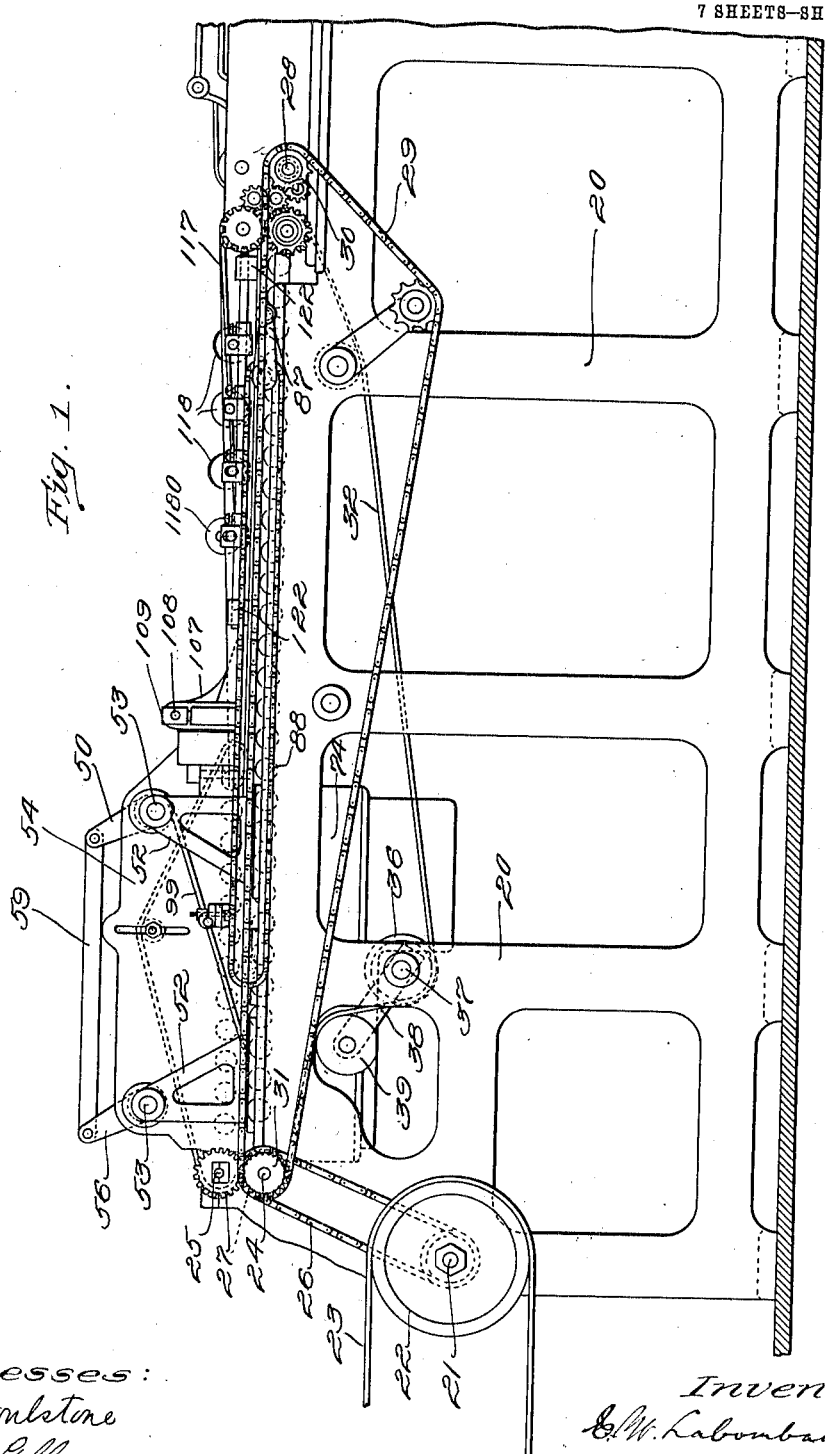

E. W. LABOMBARDE.
BOX FOLDING MACHINE.
APPLICATION FILED DEC. 7, 1909.

1,096,633.

Patented May 12, 1914.

7 SHEETS—SHEET 6.

Witnesses:
F. R. Roulstone
H. L. Allen

Inventor:
E. W. Labombarde
By Wright, Brown, Quinby & Hay
Attys.

E. W. LABOMBARDE.
BOX FOLDING MACHINE.
APPLICATION FILED DEC. 7, 1909.
1,096,633.
Patented May 12, 1914.
7 SHEETS—SHEET 7.
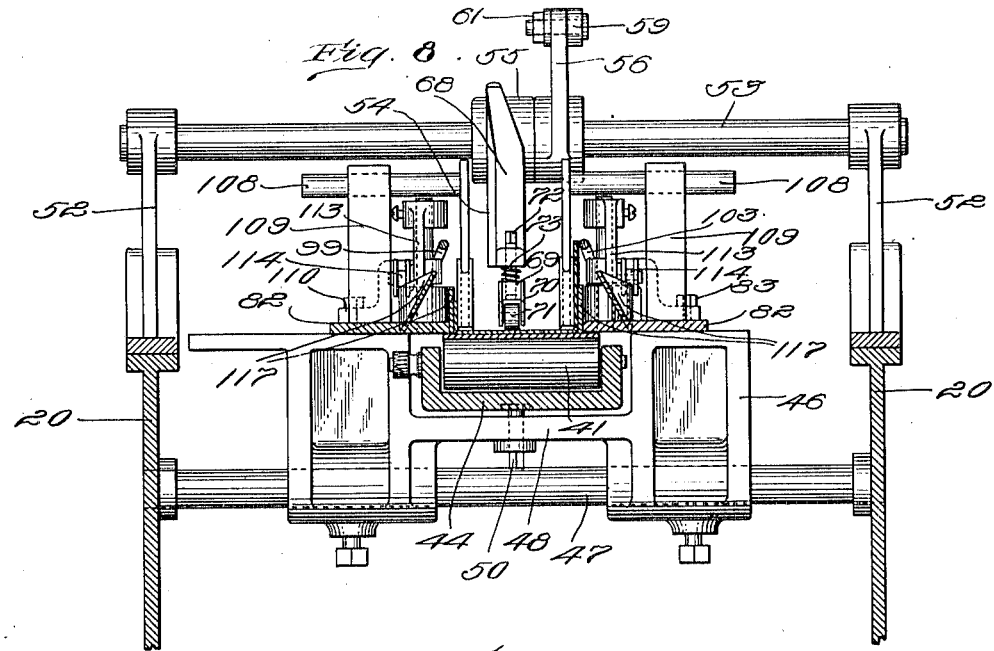
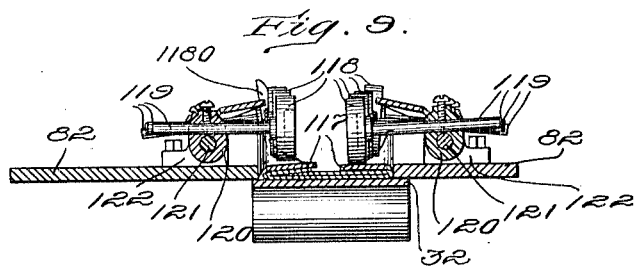
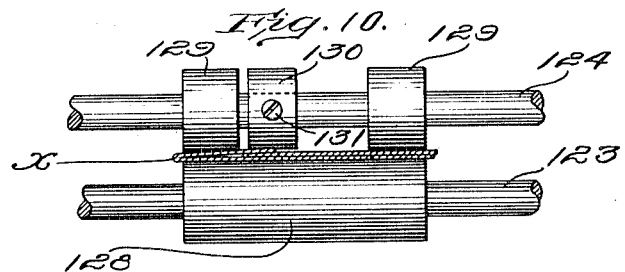
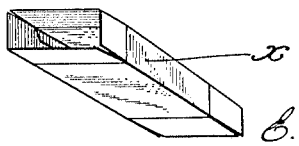
Witnesses:
F. R. Poulstone
H. L. Allen
Inventor:
E. W. Labombarde
by Wright, Brown, Quinby & May
Attys.

UNITED STATES PATENT OFFICE.

ELIE W. LABOMBARDE, OF NASHUA, NEW HAMPSHIRE.

BOX-FOLDING MACHINE.

1,096,633.      Specification of Letters Patent.      Patented May 12, 1914.

Application filed December 7, 1909. Serial No. 531,860.

*To all whom it may concern:*

Be it known that I, ELIE W. LABOMBARDE, of Nashua, in the county of Hillsboro and State of New Hampshire, have invented certain new and useful Improvements in Box-Folding Machines, of which the following is a specification.

This invention relates to box making machines of the type illustrated in Patent 915,971, granted to me March 23, 1909, said patent being granted, however, mainly for the blank feeding mechanism. This present application, however, does not illustrate the feeding mechanism since any device for supplying blanks singly may be employed. Therefore it is to be understood that the present application relates more especially to improvements upon means for folding the blanks, said folding means being of the type illustrated in said Patent 915,971.

One of the objects of my present invention is to provide a machine having a wide lower forwarding belt, adapted to carry blanks of various widths to cover a wide range of work, a flap-picking-up device being employed to lift the flap of the blank from said wide belt to, or into engagement with the flap turning or folding devices.

Another object of the present invention is to improve the devices for holding the coöperating belts to secure the best results in rapid work.

A further object of the present invention is to provide means for preserving the proper consistency of the glue.

A further object of the present invention is to provide means whereby the angle of discharge of the folded blanks may be varied, these being especially for use in connection with stacking devices.

Another object is to provide means for improving the efficiency of the twisted belts employed to fold down the flaps of the blanks.

Another object is to provide improved means for controlling the pressure of the upper belts upon the lower belt.

Further objects are to improve the various details of the mechanism whereby the belts and all other parts which coöperate in the forwarding of the blanks and folding the blanks, will have continuous movements at the same speed and in the same direction to avoid any liability of the blanks turning to the slightest degree out of their proper directions and during rapid movement through the machine.

To these ends the invention consists in the construction and combination of parts substantially as hereinafter described and claimed.

Figure 2:
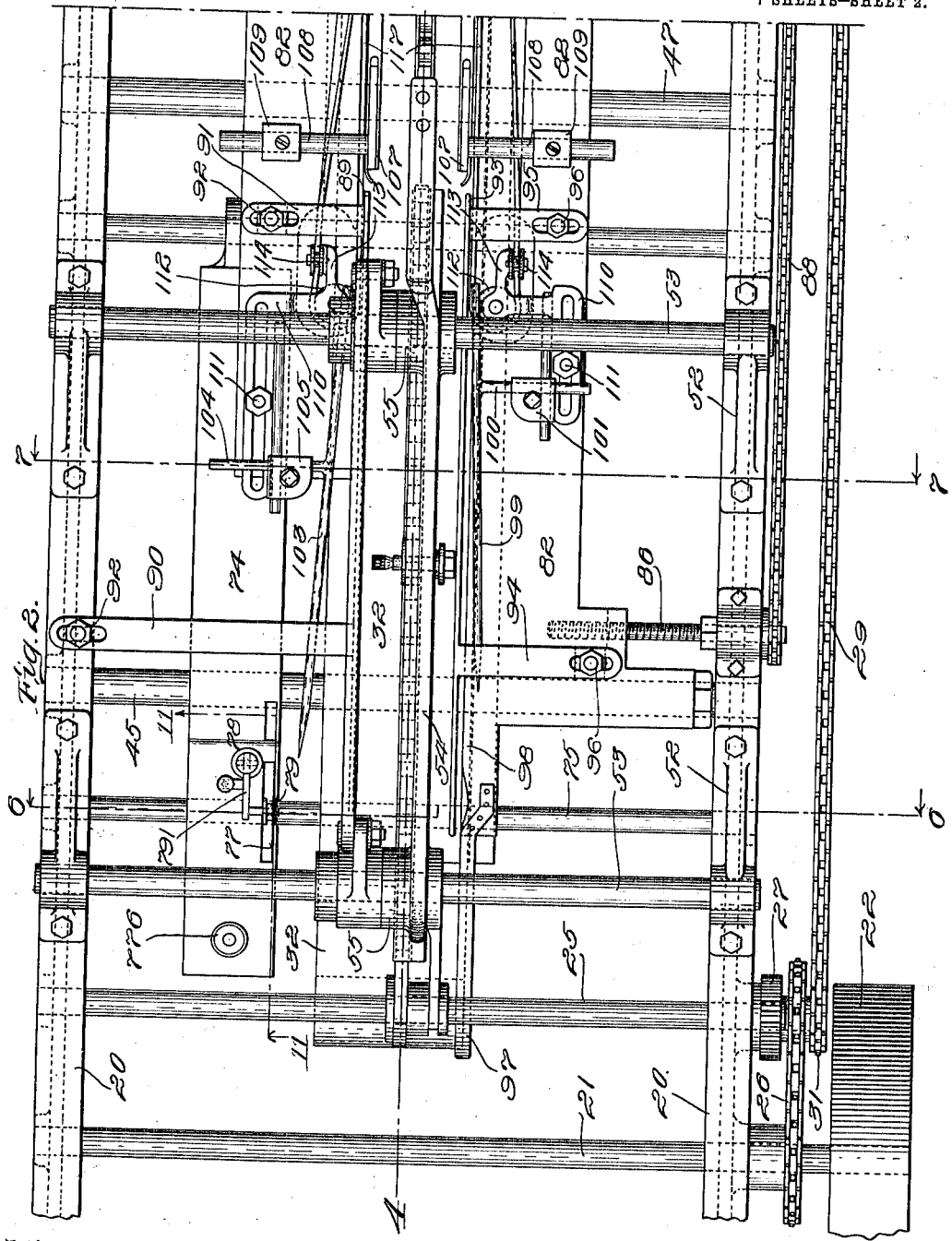
Figure 3:
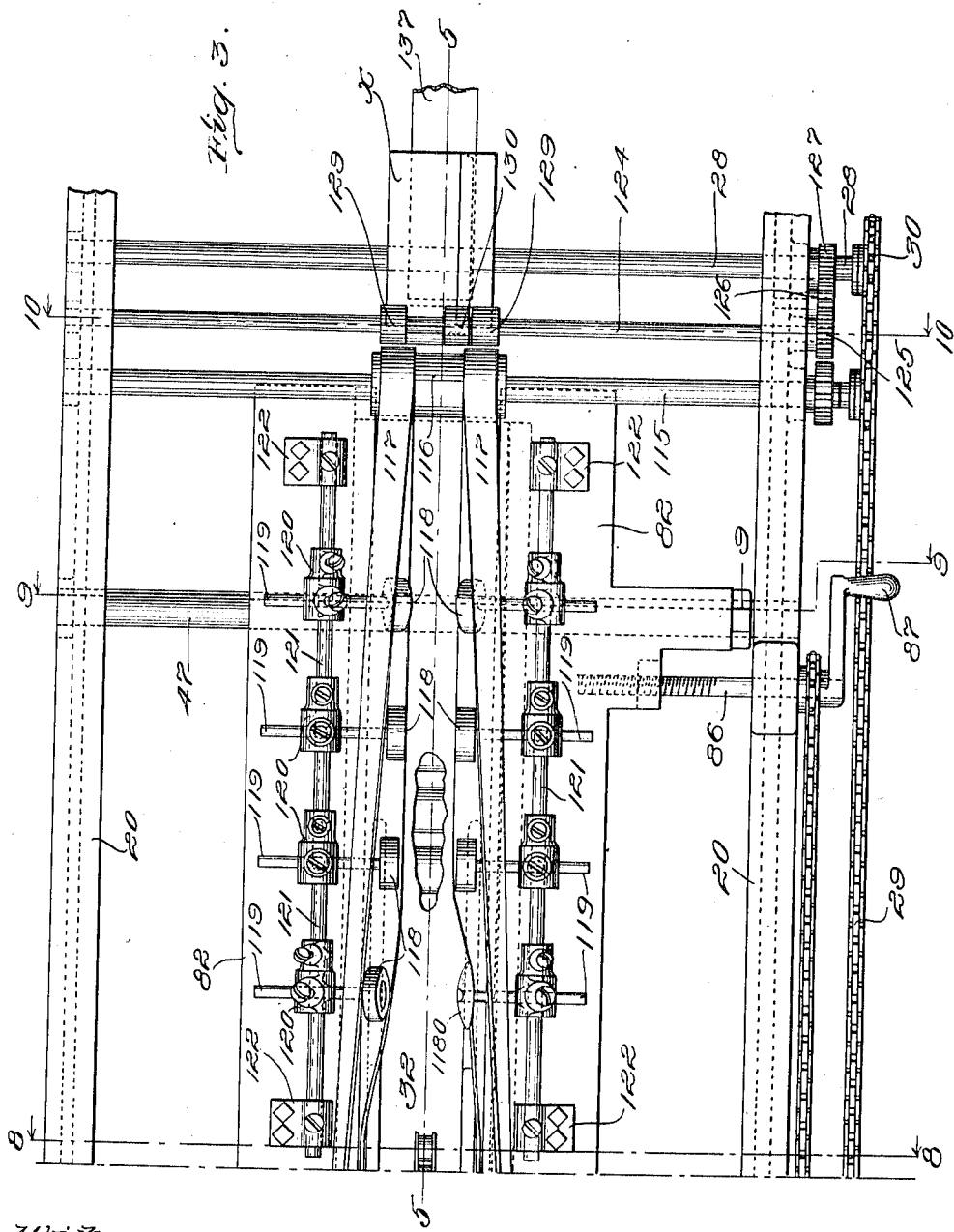
Figure 4:
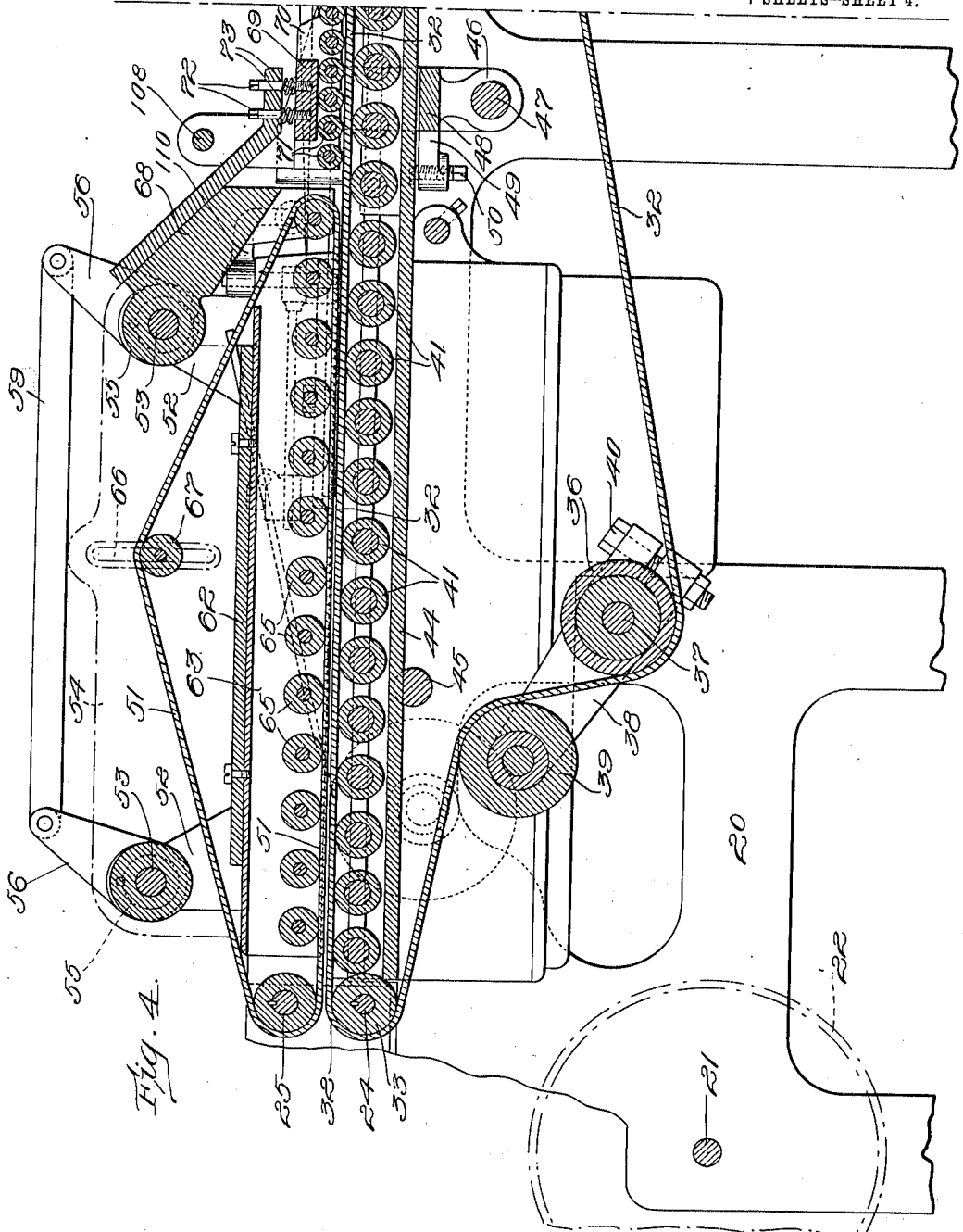
Figure 5:
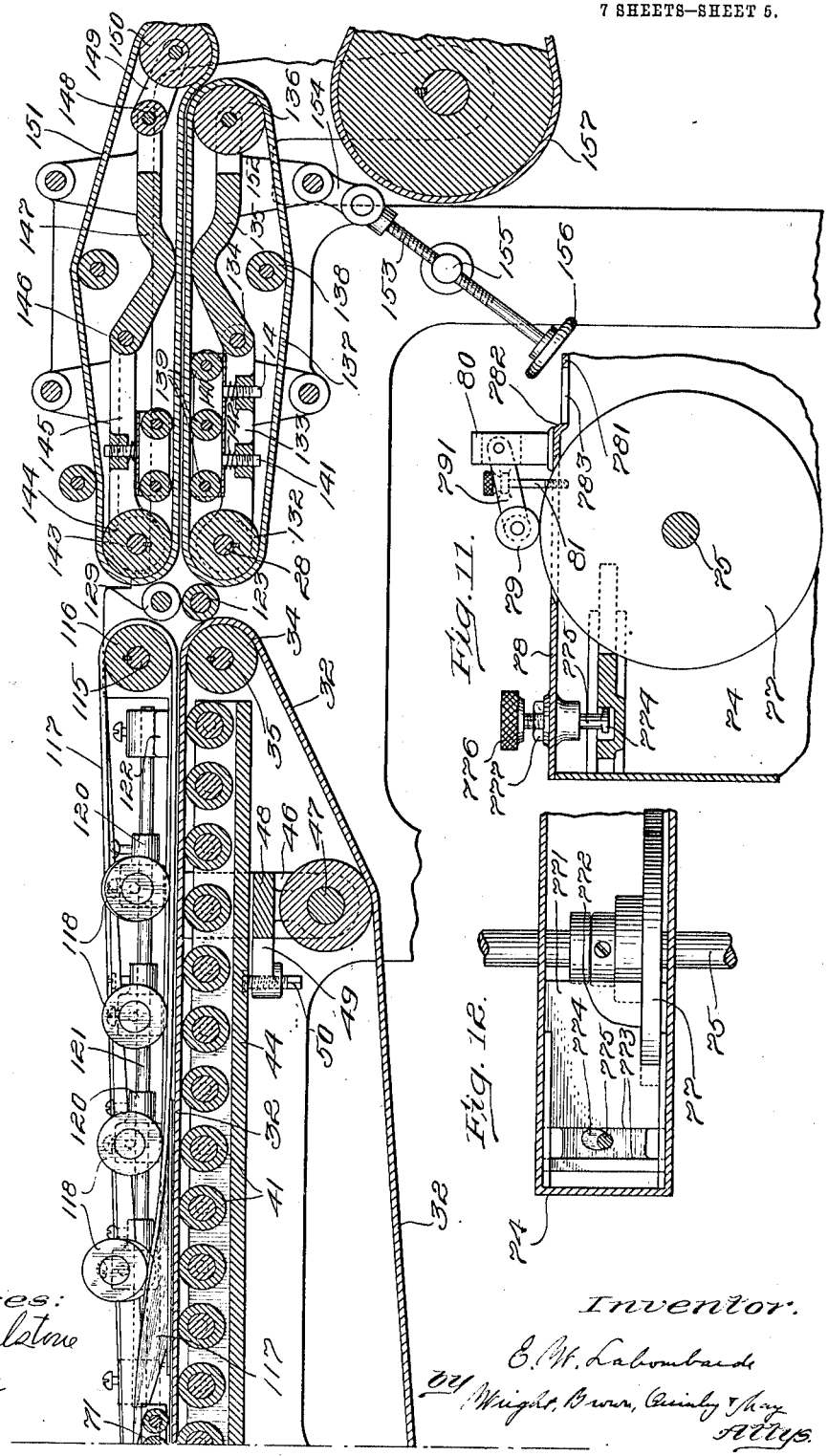
Figure 6:
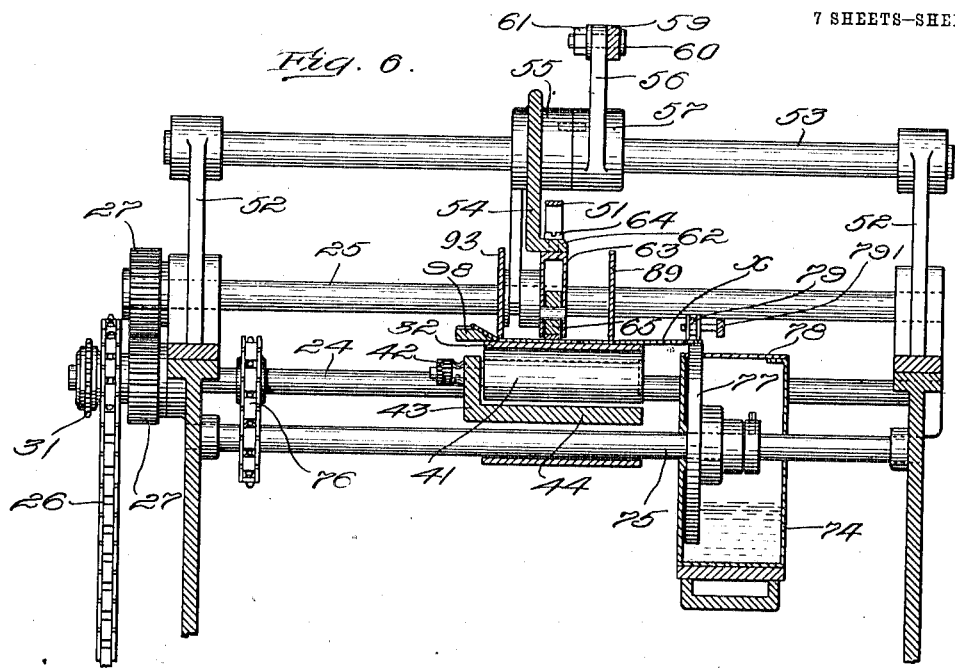
Figure 7:
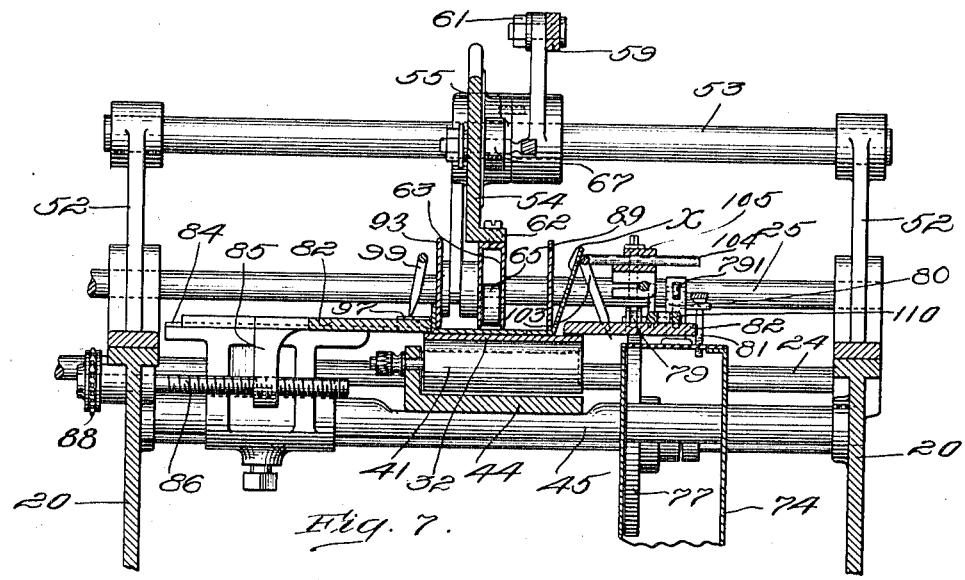

Of the accompanying drawings,—Figure 1 is a side elevation of an entire machine embodying the features of my present invention, no feeding or stacking mechanisms being shown. Figs. 2 and 3 are plan views which, taken together, illustrate on a larger scale the mechanism shown in Fig. 1. Figs. 4 and 5 represent sections on lines 4—4 and 5—5 respectively of Figs. 2 and 3. Fig. 6 represents a section on line 6—6 of Fig. 2, looking in the direction of the arrows. Fig. 7 represents a section on line 7—7 of Fig. 2, looking in the direction of the arrows. Fig. 8 represents a section on line 8—8 of Fig. 3, looking in the direction of the arrows. Figs. 9 and 10 are detail views, partly in section on the lines 9—9 and 10—10 respectively of Fig. 3, unnecessary parts which might appear on said lines being omitted. Fig. 11 is a detail view representing a section on line 11—11 of Fig. 2. Fig. 12 is a plan view of the glue pot with the cover removed. Fig. 13 is a perspective view of one form of box adapted to be folded by the machine, the box, however, being opened out instead of being in the flat condition in which it issues from the machine.

Similar reference characters indicate the same or similar parts in all of the views.

The frame of the machine is indicated as a whole at 20. At one end of the frame there is mounted a shaft 21 having a pulley 22 which may be driven by a belt 23 from any suitable source of power, or by other means. At the entrance end of the machine, that is, the end where the blanks are supplied singly by means of any suitable feed devices, there are lower and upper shafts 24 and 25, respectively, said lower shaft being driven by means of a chain 26 running over sprockets on the shafts 21, 24, the two shafts 24, 25 being provided with intermeshing pinions or small gears 27, so that said shafts will rotate in opposite directions. At the other, or delivering end of the machine, is a shaft 28, said shaft, however, as indicated in Fig. 5, constituting the main shaft of the delivering mechanism which is adjustable as hereinafter described, and takes the flat folded and glued boxes from the folding apparatus and delivers the same. A chain 29 connects a sprocket 30 on shaft 28 with a sprocket 31 on shaft 24 so that the belts carried by the folding mechanism and the delivering mechanism will move positively in the same direction and at the same speed.

The main forwarding belt 32, is of a width capable of carrying all ordinary blanks of various sizes, said belt being wider than many smaller sizes of blanks. At one end, said belt runs over a pulley 34 on a shaft 35. Said shaft 35 has a sprocket which is engaged by the upper stretch of chain 29, and said shaft is close to the main shaft 28 of the compressing and delivering mechanism. In order to keep the belt 32 at the proper tension, it may run, as shown in Fig. 4, under an idler 36 mounted on a fixed shaft 37 on which one or more arms 38 may be adjustably clamped, said arm or arms carrying a tightener roll 39 over which the belt passes. To vary the position of the roll 39 to obtain the proper tension on the belt, the arm or arms 38 which embrace the shaft 37 are secured in their adjusted angular position by means of suitable clamping screws 40.

To properly support the stretch of the belt 32 on which the blanks are carried, rolls 41 are mounted on spindles or stud shafts 42 carried in bearings provided in a flange or flanges 43 rising from a bed casting 44. Said bed 44 is suitably supported as by a bar 45 near one end of the machine (see Figs. 4, 5 and 7) and castings 46 at the other end and preferably also at an intermediate point. The castings 46 are mounted on cross bars 47 which extend across between the side members of the frame of the machine. To provide for vertical adjustment of the bed 44, the castings are formed with central web portions 48, each having an arm 49 through which a screw 50 is tapped, the upper end of the screw engaging the under surface of the bed 44.

The wide belt 32 acts as a main forwardly belt the entire length of the machine from the point where the blanks are fed to the point where they issue in folded condition to the compressing and delivering apparatus. The portions of the machine above the belt 32 and which carry devices to coöperate with the long wide belt to convert the blanks into folded flat boxes, comprise three distinct groups. I will now proceed to describe the first group which co-acts with the main belt in carrying the blanks over the gluing devices and turns up the flaps preliminarily. For this purpose I provide an upper flat and preferably narrow belt 51 which is mounted to travel over substantially the center of the belt 32. To support said belt the following structure is provided:—Uprights 52 carried by the side members of the frame of the machine support two parallel rods 53, on which is mounted a vertical elongated web 54, said web having enlarged portions or bearings 55 through which the rods 53 pass. The openings through which the rods pass are slightly elongated vertically as shown in Fig. 4. Mounted on each rod 53 is an arm 56, the hub 57 of which extends into the bearing 55, this extension, however, being eccentric to the rod 53. The two arms 56 are connected by a link or hand rod 59, the connection at one end including a bolt 60 and a nut 61. By loosening and tightening the nut 61, the two arms 56 and their connecting link may be swung over to the position shown either in Fig. 1 or Fig. 4, or an intermediate position, and secured in such adjusted position. This adjustment of the arms 56, through the eccentric mountings described, results in varying the height of the web 54. Said web 54 is provided at its lower edge with a foot or flange 62, to which a roll housing 63 is secured as by screws 64. The bottom of the housing is open and rolls 65 are mounted in the side walls of the housing, the lower edges of the side walls of the housing serving to laterally guide the belt 51, while the rolls 65 hold the lower stretch of said belt down upon the blanks passing between the upper and lower belts. Suitable means are provided for maintaining the belt 51 at the proper tension, said means comprising a vertical slot 66 in the web 54, and a roll 67 extending under the upper stretch of the belt and having means for securing it at the proper height relatively to said slot 66.

Owing to the fact that the shafts 24 and 25 are geared together as by the pinions 27, both of the belts 32 and 51 are positively driven at the same speed, the direction of movement being, of course, from the left to the right in Figs. 1, 2, 3, 4 and 5.

Before describing the gluing devices, I will refer to the second group of devices which carry the blanks with their flaps turned upward and one of them glued, to the last group which turns the flaps down upon the body of the blank. The web 54 is provided with an extension 68 (see Figs. 4 and 8), a block 69 having side plates 70 and rolls 71 mounted in said side plates being connected to the lower end of said extension by means of guide pins 72. Springs 73 coiled around the guide pins between the under face of the lower end of the extension and the upper face of the block 69, serve to press the entire set of rolls 71 toward the belt 32. The side plates 70, and the rolls 71 carried thereby extend far enough toward the right or delivery end of the machine to hold the blanks with their flaps in partially turned condition to insure said blanks being carried by the main belt along far enough to cause them to be engaged by the twisted belts hereinafter described. This immediate pressing device is employed because it is relatively small and permits the flaps of the blank to pass from a position where it has the flaps merely turned upward along to a position where the flaps commence to be folded downward toward each other by the twisted belts.

To supply glue, I provide a reservoir or pot 74 which is usually provided with a suitable heater, a shaft 75 extending through the pot or reservoir, said shaft being preferably positively rotated at the proper speed by suitable means such as a sprocket chain 76 connecting a sprocket wheel on said shaft 75 with a sprocket on the shaft 24. Secured to said shaft 75 is a wheel or disk 77, a portion of the periphery of which projects through a slot in a cover 78. This structure provides for entirely inclosing the glue pot or receptacle to aid in keeping the glue at a proper consistency.

To hold the edge of the wide flap of the blank x down upon the periphery of the wheel or disk 77, I provide a roll 79 carried at the end of an arm 791 pivoted to a post 80 rising from the top of the glue receptacle. By means of a screw 81 mounted in passing through a lateral projection the top of the glue receptacle, the roll 79 may be accurately set to obtain just the proper degree of pressure for holding the blank flat upon the glue wheel or disk 77. Said screw has a collar engaging projections of the arm 791, as shown by dotted lines in Fig. 11, whereby the roll 79 may be set as described, the structure preventing the roll 79 from dropping into contact with disk 77 when no blank is passing. In practice the roll 79 will be held by the screw so that there will always be a slight space between the roll and the wheel, although no such space is indicated in Fig. 11.

To support various devices which lift and turn up the flaps of the blank, I provide two table plates 82, (see Figs. 2 and 3), one of which may be mounted in fixed position, while the other is laterally adjustable toward and from the longitudinal center of the machine. The fixed plate, as illustrated, is supported on the castings 46 and secured thereto as by suitable screws 83 (Fig. 8). The other plate 82 is supported upon castings at the other side of the longitudinal center of the machine and may be guided thereon by ways such as shown at 84 in Fig. 7. Lugs 85 projecting downward from the adjustable plate 82 are tapped for screws 86, there being two such screws as shown in Figs. 2 and 3. One of the screws 86 is provided with a crank handle 87, and each screw 86 has a sprocket at its outer end, the two sprockets being connected by a chain 88. By rotating the crank 87, both screws 86 are actuated so as to shift the adjustable plate 82 toward and from the longitudinal center of the machine according to the width of the blanks being used. The adjustment of said plate 82, of course, causes a corresponding adjustment of the parts supported by it. To render the following description clearer, the left-hand side of the machine is to be understood as that side at the left of an operator who stands at the end where the blanks are supplied. On the left side of the machine is a folder gage plate 89 having two arms 90, 91, (see Fig. 2) which are slotted at their outer end. Screws or bolts 92 pass through the slots of the arms into fixed portions of the machine, the slots permitting accurate adjustment so that the lower edge of the gage 89 will coincide with the left-hand crease of the box blank x (see Fig. 6). A similar folder gage 93 at the right of the machine has arms 94, 95, slotted and secured by bolts or screws 96 to the adjustable plate 82. The two gages 89, 93 are designed to coincide with two of the creases of the box blank so that when the flaps are folded up toward the outer sides of said gages, the "breaks" will be made so that there will be a short flap at the right and a wide flap at the left. In this connection it is to be borne in mind that the sectional views 6, 7 and 8 are all supposed to be looking toward the left of the Figs. 2 and 3 and consequently, the wide flap, turned up at the left of the machine, appears in the sectional views as at the right and it is to be also understood that with the parts adjusted as shown the glue is applied to the under side of the edge of the wide flap; but obviously the parts can be so adjusted that the narrow flaps will pass over the wheel 77 and receive glue.

Since in practice it will be difficult to start the upward turn of the narrow flap when such flap does not project beyond the edge of the wide belt 32, I provide a finger 97 (Fig. 2) which projects sufficiently over, and tangential to, the curve of the belt passing over the pulley 33, to pick up or guide the narrow flap and prevent it from passing through the machine down flat in contact with the belt. Said finger 97 guides the flap on to a slightly raised portion 98 (Figs. 2 and 6), this raised portion continuing until said narrow flap is guided above an inclined guide rod 99, which is adjustably secured to the plate 82 by means of an angular arm 100 from said rod 99, said arm 100 passing through a clamp 101 mounted on a post 102 rising from said plate 82. Another guide rod 103 has an arm 104 secured by a clamp 105 to a post 106 rising from the end of the plate 82. The end of the rod 103 is tapered and extends downward beyond the edge of and downward below the plane of the upper stretch of the belt 32 so that the wide flap of the blank will engage the side of the rod 103 and ride up the incline thereof.

As shown in Fig. 2, the pick-up finger 97 is secured to the plate 82, while the gage 93 and the folder rod 99 are adjustably carried by said plate. Blanks differ from each other as to their stiffness and quality of material and in order that the "break" will be properly made as hereinbefore described, it is desirable that the pick-up finger and the gage and the folder shall be capable of relative adjustment.

By referring to Figs. 2 and 8 it will be seen that beyond the ends of the gages 89, 93, and in alinement therewith, are supplemental gages 107 carried by arms 108 adjustably mounted in posts 109 rising from the plates 82. These supplemental gages not only hold the blank down upon the main forwarding belt after it escapes from under the belt 51, but also hold the flaps upright against portions of the twisted belts which I shall presently describe, it being understood that the outer sides of the flaps are engaged by portions of the twisted belts before said flaps leave the gages 89, 93.

Mounted on the plates 82 are brackets 110, said brackets having slots through which adjusting screws 111 pass into the plates 82, the brackets being therefore adjustable longitudinally of the machine. Each bracket carries an upright spindle for a pulley 112, and each bracket also has an arm 113 carrying a double-flange roll 114 (see Figs. 2 and 8). At the far end of the machine, above the shaft 35, is a shaft 115 which is positively driven by means of a pinion intermeshing with a pinion on the shaft 35. On said shaft 115 is a pulley 116 over which two belts 117 pass, said belts 117 passing also around the vertical pulleys 112. Since the pulley 116 is horizontal, the belts 117 are necessarily twisted as represented. The rolls 114 simply prevent the belts from rising on the pulleys 112 above the proper positions for the belts 117.

As the turned-up flaps of the blank leave the gages 89, 93, the outer sides of said flaps are engaged by the vertical portions of the belts 117. The flaps being thus engaged, and the body of each blank having its end face still in contact with the main forwarding belt 32, the blank continues to move with absolute accuracy without danger of being twisted out of its proper position, and the flaps of the blank then pass behind the supplemental gages 107, the body of the blank being held down on the main forwarding belt by the rolls 71. But shortly after the belts 117 leave the supplemental gages 107, they begin to follow the twist, and consequently tend to fold the flaps of the blank inward and to finally press the flaps down as indicated in Fig. 9. The stretches of the belts 117 which thus co-act with the belt 32 are kept in their proper positions by means of rolls 118 carried by spindles 119, adjustably mounted in hubs 120, said hubs being carried by rods 121 extending longitudinally of the plates 82 and secured thereto in suitable bearings 122. The spindles 119 are set at various angles relatively to each other, so as to properly guide the belts 117 as indicated particularly in Figs. 3, 5 and 9.

It will now be understood that the belts 117, while serving as folding-belts, also coöperate with the belt 32 in carrying the blanks forward, because they serve to keep the blanks in operative contact with said belt 32, all of said belts traveling at the same rate of speed. The rods 99 and 103 do the preliminary folding and the belts 117 the final folding. The adjustable plate 82 constitutes a carriage on which the rod 99 is mounted, and also one of the belts 117. This carriage 82 has means for adjusting it, comprising the two screws 86 and the chain 88 which connects the sprocket-wheels of the two screws. Therefore the structure described provides means for bodily adjusting the carriage transversely of the machine. Since the lower belt 32 is a wide one, no adjustments thereof are necessary when making changes to suit different widths of blanks.

It will also be understood that the machine has a blank-carrying belt and a twisted folding belt which is adjacent to and is longitudinally of the carrying belt, means being provided for concurrently actuating said belts comprising the pulley 34, shaft 35 and the shaft 115 which is geared to the shaft 35. The first of the rolls 118 constitutes a back member, the under curved surface of which supports the angular or twisted portion of the folding belt and it is adjustable along the rod 121 in a direction longitudinally of the folding belt. The other rolls 118 also have means whereby they may be adjusted longitudinally of the folding belt, and they act to maintain the folding belt for a portion of its length in parallelism with the carrying belt.

As best shown in Fig. 3, one of the belt-guiding rolls 118b, instead of engaging the outer side of the stretch of the belt, laps over and engages the inner side so as to hold or pull back this portion of the belt to render it certain that the wide flap which is being turned down by the belt at the left of the machine, will be turned down first in order that the narrow flap will come on top of the wide flap and consequently engage the surface to which glue has been applied along the edge of the wide flap.

The last pair of rolls 118, as shown in Fig. 9, presses the belts 117 down upon the folded flaps of the blank, but sometimes this is not sufficient to give the pressure necessary to cause the two flaps to be firmly stuck together by the glue. To provide for extra pressure, especially at the point where the glue has been applied, I provide the following structure: Referring especially to Figs. 3, 5 and 10, I provide lower and upper shafts 123, 124. These two shafts have intermeshing pinions at one end, and the pinion 125 at the end of the upper shaft 124 meshes with an idle pinion 126 which in turn meshes with a pinion 127 secured to the positively driven shaft 28, the idle pinion providing for the rotation of the two shafts 123, 124, in the proper direction to positively continue the movement of the folded box. On the shaft 123 is a wide pulley 128 and on the shaft 124 are three pulleys of which the outer ones 129 are of slightly greater diameter than the intermediate pulley 130. The pulley 130 is adjustable along the shaft 124 as by means of a screw 131, so that said pulley 130 may be adjusted accurately to proper position to engage the folded box at the point where it is thickest, due to the overlapping of the edges of the flaps.

To still further hold the folded box under compression, I provide the following structure, referring especially to Fig. 5: Secured to the shaft 28 which, as has been stated, is positively driven by the chain 29, is a pulley 132. Also mounted on said shaft is a frame 133, having pivoted thereto, as at 134, an arm 135 having a pulley 136 at its outer end. A belt 137 passes over the pulleys 132, 136, said belt having a suitable tension roll 138, and having a portion of its upper stretch supported by rolls 139 mounted in a frame 140 mounted on pins 141 which pass through openings in the frame 133, springs 142 being employed to hold the frame 140 and its rolls 139 up against the under surface of the upper stretch of said belt 137. Mounted in the frame of the machine above the shaft 28 is a shaft 143, said shaft being geared to the shaft 28. Said shaft also carries a pulley 144. A frame 145 has pivoted to it at 146 an arm 147, said arm having pivoted to it at 148 a yoke 149, the outer end of which supports a pulley 150. A belt 151 passes around the pulleys 144 and 150 and is provided with tension rolls and pressure rolls similar to those described in connection with the lower frame.

The lower arm 135 has a lug 152 to which a screw 153 is connected by a link 154. The screw 153 passes through a tapped opening in a rotatable stud 155, and has a hand wheel 156. By operating the hand wheel 156, the arm 135 may be adjusted up or down to vary the angle of delivery of the folded boxes as they issue from the compressing apparatus, comprising the belts 137, 151. In Fig. 5 the pulley and belt partially indicated at 157 represent a portion of a stacking apparatus which is not further illustrated.

The yoke 149 which carries the pulley 150 may be adjusted as by means of a nut at one end of the pivot 148, so as to cause the upper belt to curve more or less downward over the delivery end of the lower belt so as to throw the folded box more or less downward. It will therefore be understood that the compressing belts 137, 151 may be utilized to perform the further function of directing the angle at which the folded boxes will be delivered from the machine, in order to insure proper gathering up or stacking.

As best shown in Figs. 11 and 12, the cover of the glue pot or receptacle is formed in two planes, the portion which is in the lower plane being behind or beyond the slot through which the wheel 77 projects. This portion in a lower plane is indicated at 781, a shoulder being provided at 782. Just beyond the shoulder 782 the cover is formed with a slot 783. The object of this construction is to obviate as far as possible the accumulation of threads of glue. In box-making machines, the rapid passage of the blanks frequently causes an objectionable accumulation of threads of glue which become strung out in the direction of the path of movement of the blanks. The structure, as just described, prevents such accumulation, and as soon as a mass of glue threads forms, such mass, or the greater part of it, will drop through the slot 783 and be again melted in the pot or receptacle. As also shown in Figs. 11 and 12, I provide a scraper 771 having a slot 772 so that said scraper will fit partially over the wheel 77 to engage the periphery and parts of the sides thereof. Said scraper is formed with two abutments 773 between which is mounted a cam 774 on the lower end of a spindle 775 mounted in the cover and having a knurled handle wheel 776. The spindle 775 is preferably threaded and provided with a nut 777 by means of which it may be clamped in adjusted position. By rotation of the spindle 775 and securing it in adjusted position, the location of the scraper with reference to the glue wheel or disk may be accurately secured.

I claim:

1. A box folding machine including in its construction a pair of folding belts, a rod substantially parallel with each of said belts, a series of hubs adjustably mounted on each of the rods, spindles adjustably supported by said hubs, and rolls carried by said spindles and adapted to support the operative stretch of each of said folding belts.

2. A box-folding machine comprising in its construction a main forwarding belt, a superimposed belt having its acting portion parallel with the acting portion of the main belt, guiding pulleys for said belts, supporting rolls for the superimposed belt, and means for simultaneously adjusting the height of all of said supporting rolls independently of the said guiding pulleys.

3. A box-folding machine including in its construction a main forwarding belt, transverse rods above said belt, a web having openings through which said rods pass and having bearings, arms having hubs with eccentric portions entering the bearings of said web, and means for oscillating said arms.

4. In a box-folding machine, a pair of superimposed belts, rolls for supporting the coöperative stretches of said belts, a housing in which the rolls for the upper belt are mounted, said housing having its sides extending to a plane below the rolls mounted therein to provide lateral guides for the belt.

5. A box-folding machine including in its construction blank forwarding and folding means, a pair of shafts beyond the folding means, a wide roll on one of said shafts and a plurality of rolls of different diameters on the other shaft.

6. A box-folding machine including in its construction blank forwarding and folding means, a pair of shafts beyond the folding means, a wide roll on one of said shafts and a plurality of rolls of different diameters on the other shaft, one of said plurality of rolls being adjustable along its shaft.

7. A box-folding machine comprising in its construction a wide forwarding belt, a narrow belt bearing upon the upper portion of the entrance end of the forwarding belt, a pick-up finger to lift the flap of the box blank above the plane of the said forwarding belt and a folder gage and a folder beyond the pick-up finger, said gage and folder being laterally adjustable independently of said finger.

In testimony whereof I have affixed my signature, in presence of two witnesses.

ELIE W. LABOMBARDE.

Witnesses:
A. W. HARRISON,
P. W. PEZZETTI.